US007373509B2

(12) United States Patent
Aissi et al.

(10) Patent No.: US 7,373,509 B2
(45) Date of Patent: May 13, 2008

(54) MULTI-AUTHENTICATION FOR A COMPUTING DEVICE CONNECTING TO A NETWORK

(75) Inventors: Selim Aissi, Beaverton, OR (US); David Wheeler, Gilbert, AZ (US); Krishnamurthy Srinivasan, Chandler, AZ (US); Randy E Hall, Gilbert, AZ (US); Ned M. Smith, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 744 days.

(21) Appl. No.: 10/750,340

(22) Filed: Dec. 31, 2003

(65) Prior Publication Data

US 2005/0149730 A1    Jul. 7, 2005

(51) Int. Cl.
*H04L 9/00* (2006.01)
(52) U.S. Cl. ............... 713/168; 713/169; 713/170; 713/182
(58) Field of Classification Search ............... 713/169, 713/168, 182
See application file for complete search history.

(56) References Cited

U.S. PATENT DOCUMENTS

| | | | |
|---|---|---|---|
| 4,734,865 A | | 3/1988 | Scullion et al. |
| 6,526,509 B1 * | | 2/2003 | Horn et al. ............. 713/171 |
| 6,711,400 B1 * | | 3/2004 | Aura ..................... 455/411 |
| 6,718,467 B1 * | | 4/2004 | Trostle ................... 713/171 |
| 6,868,406 B1 * | | 3/2005 | Ogg et al. ................ 705/60 |
| 6,950,522 B1 * | | 9/2005 | Mitchell et al. .......... 380/280 |
| 6,996,715 B2 * | | 2/2006 | Greenberg et al. ........ 713/168 |
| 7,007,164 B1 * | | 2/2006 | Euchner .................. 713/168 |
| 2004/0267668 A1 | | 12/2004 | Aissi |

OTHER PUBLICATIONS

"U.S. Appl. No. 10/612,292 Amendment Under 37 C.F.R. 1.116 filed Mar. 26, 2007", 15 pgs.
"U.S. Appl. No. 10/612,292 Final Office Action mailed Apr. 20, 2006", 11 pgs.
"U.S. Appl. No. 10/612,292 Non-Final Office Action mailed Sep. 23, 2005", 7 pgs.
"U.S. Appl. No. 10/612,292 Response filed Jan. 23, 2006 in response to non-final office action mailed Sep. 23, 2005", 11 pgs.
"U.S. Appl. No. 10/612,292 Response filed Jun. 20, 2006 in response to Final Office Action mailed Apr. 20, 2006", 14 pgs.

* cited by examiner

*Primary Examiner*—Gilberto Barron, Jr.
*Assistant Examiner*—Samson Lemma
(74) *Attorney, Agent, or Firm*—Schwegman, Lundberg & Woessner, P.A.

(57) ABSTRACT

In an embodiment, a method includes authenticating a computing device and a different entity for a session of communication between the computing device and the different entity. The authenticating includes generating a hash of a value selected from the group consisting of an encrypted attribute associated with computing device stored in the computing device and the identification of the session stored in a protected storage within the computing device. The authenticating also includes encrypting a random number based on the hash. The authenticating includes transmitting the encrypted random number to the different entity.

22 Claims, 11 Drawing Sheets

MULTI-AUTHENTICATION FOR A COMPUTING DEVICE CONNECTING TO A NETWORK

CROSS-REFERENCE TO RELATED APPLICATION

The present patent application is related to Aissi U.S. patent application Ser. No. 10/612,292, entitled "Secured and Selective Runtime Auditing Services Using a Trusted Computing Device", filed on Jun. 30, 2003, which is assigned to the assignee of the present patent application.

TECHNICAL FIELD

This invention relates generally to electronic data processing and more particularly, to multi-authentication for a computing device connecting to a network.

BACKGROUND

In open network systems (such as the Internet), communication paths may be exposed to various attacks by malicious entities. Such attacks may include eavesdropping, spoofing, impersonation, etc. Communications by computing devices using these networks are therefore, also subject to these types of attacks.

Computing devices (both wired and wireless) are being used to perform different types of electronic commerce transactions over such networks. For example, mobile computing devices, such as cellular telephones, personal digital assistants (PDAs), etc., are used to purchase and/or update the purchase of an electronic (e)-Ticket (for a music concert, an airline ticket, etc.). There are a number of challenging security requirements for such devices when supporting mobile eCommerce. One such requirement is authentication of the computing device and the operator/service provider. In particular, without physical access to the equipment of the operator/service provider, users of the mobile computing devices need to ensure that connection is being made to legitimate access points on the wireless network. In other words, the users of the mobile computing devices need to avoid connection to a "rogue" access point or mobile device that is set up as part of a man-in-the-middle attack.

BRIEF DESCRIPTION OF THE DRAWINGS

Embodiments of the invention may be best understood by referring to the following description and accompanying drawings which illustrate such embodiments. The numbering scheme for the Figures included herein are such that the leading number for a given reference number in a Figure is associated with the number of the Figure. For example, a system 100 can be located in FIG. 1. However, reference numbers are the same for those elements that are the same across different Figures. In the drawings.

DETAILED DESCRIPTION

Methods, apparatus and systems for multi-authentication for a computing device connecting to a network are described. In the following description, numerous specific details are set forth. However, it is understood that embodiments of the invention may be practiced without these specific details. In other instances, well-known circuits, structures and techniques have not been shown in detail in order not to obscure the understanding of this description.

This detailed description is divided into four sections. In the first section, a system overview is presented. In the second section, a hardware and operating environment is described. In the third section, multi-authentication operations are described. In the fourth section, audit operations related to the multi-authentication operations are described.

System Overview

In this section, a system overview is presented. The system overview presents a network configuration used in conjunction with embodiments of the invention. The system overview also presents the general functionality of the network configuration.

Figure 1:
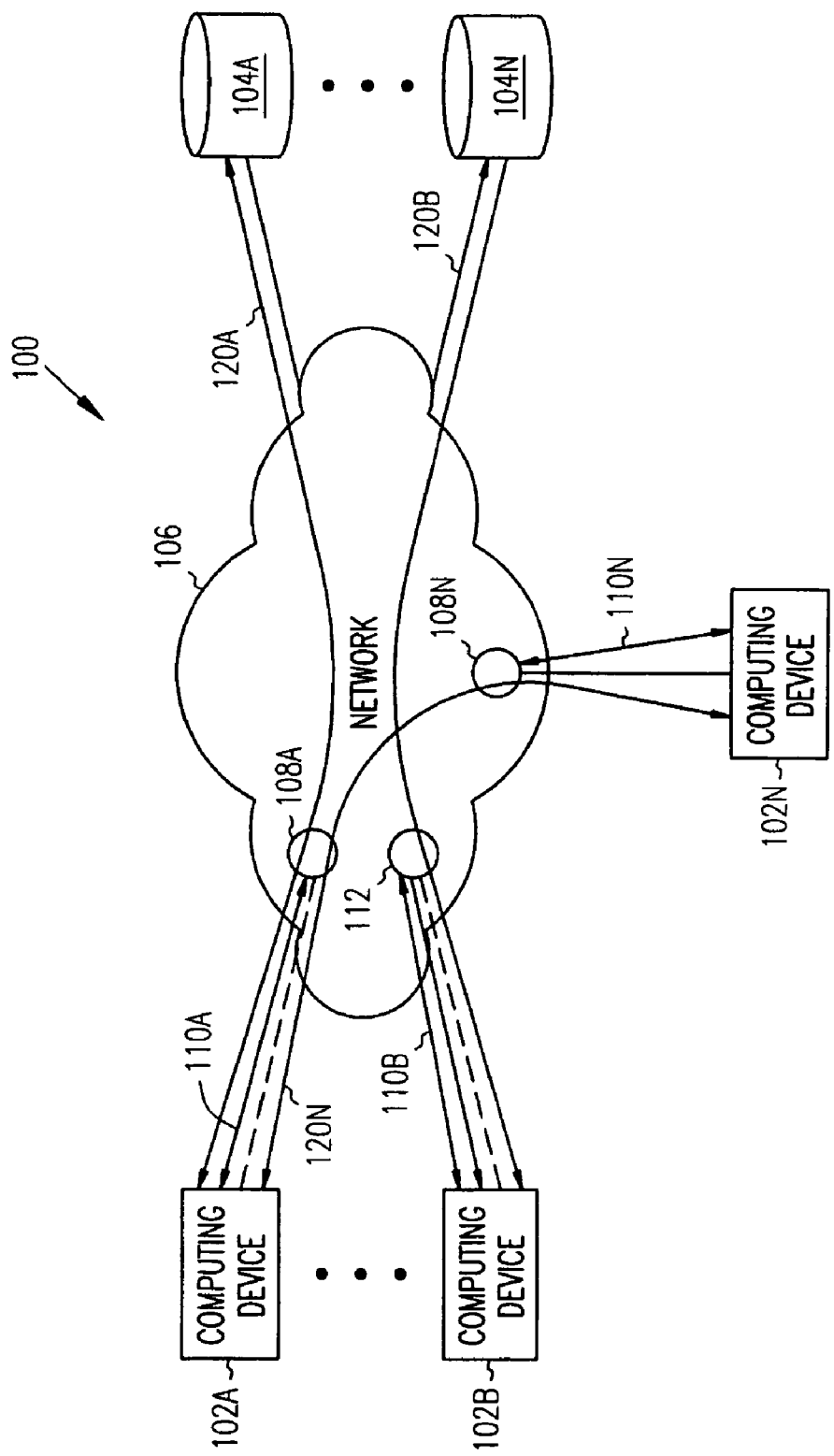
FIG. 1 illustrates a system for multi-authentication for a computing device connecting to a network, according to one embodiment of the invention.

FIG. 1 illustrates a system for multi-authentication for a computing device connecting to a network, according to one embodiment of the invention. FIG. 1 illustrates a system 100 that includes a number of computing devices 102A-102N and a number of servers 104A-104N that are coupled together through a network 106.

The network 106 may be a wide area network, a local area network or a combination of different networks that provide communication among the computing devices 102 and between the computing devices 102 and the number of servers 104. For example, the number of computing devices 102A-102N may be different types of wireless computing devices, wherein a part of the network 106 is configured to process wireless communications, while a different part of the network 106 may be configured to process wired communications for communications with the number of computing devices 102A-102N and the number of servers 104A-104N.

The system 100 illustrates a number of different ways that the computing devices 102A-102N are being coupled to the network 106. For example, the computing device 102A is coupled (through a wireless communication) to the network 106 through an access point 108A. The computing device 102B is coupled (through a wireless communication) to the network 106 through an operator server 112. The computing device 102N is coupled (through a wired communication) through an access point 108N.

As further described below, multi-authentication occurs between the computing devices 102A-102N and equipment of the operator/service provider (e.g., the operator server 112/access points 108A-108N) in the network 106 prior to communications involving the computing devices 102 and other devices coupled to the network 106. In particular, a multi-authentication 110A occurs between the computing device 102A and the access point 108A. A multi-authentication 110B occurs between the computing device 102B and the operator server 112. A multi-authentication 110N occurs between the computing device 102N and the access point 108N. Accordingly, the computing devices 102 have authenticated the operator server 112/access points 108A-108N, while the operator server 112/access points 108A-108N have authenticated the computing device 102.

Communications that may occur subsequent to the multi-authentication are illustrated by communications 120A-120N. As shown, the communication 120A occurs between the computing device 102A and the server 104A. The communication 120B occurs between the computing device 102B and the server 104N. The communication occurs between the computing device 102N and the computing device 102A. Such communications may be mobile (m)Commerce transactions. For example, the computing device 102A may be a PDA, wherein a user of the computing device 102A buys an airline ticket or changes an airline reservation using the web site (or portal) for the airline hosted on the server 104A. Another example may be communications involving a wireless telephone call between a first cellular telephone and a second cellular telephone. For example, the computing device 102A and the computing device 102N may be cellular telephones, wherein the computing device 102N transfers data to the computing device 102A.

Hardware and Operating Environment

Figure 2:
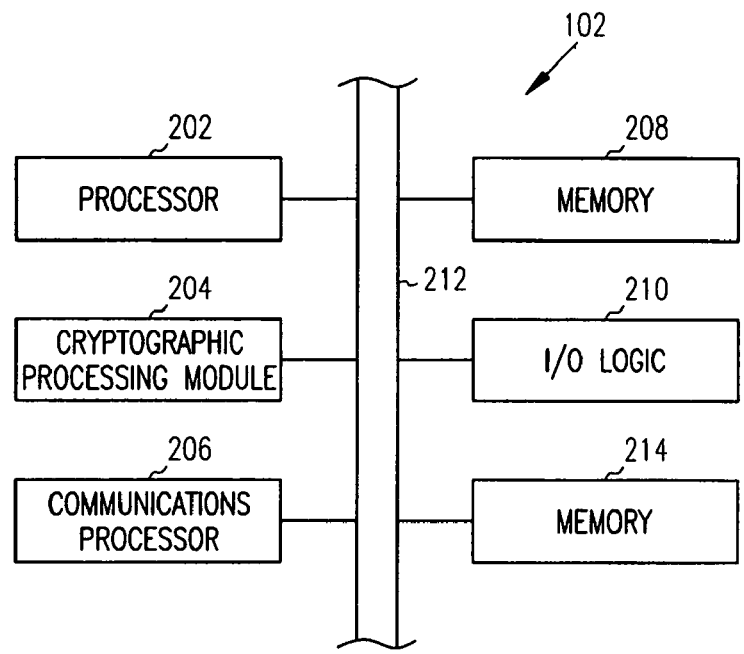
FIG. 2 illustrates a more detailed block diagram of a computing device for multi-authentication, according to one embodiment of the invention.
Figure 3:
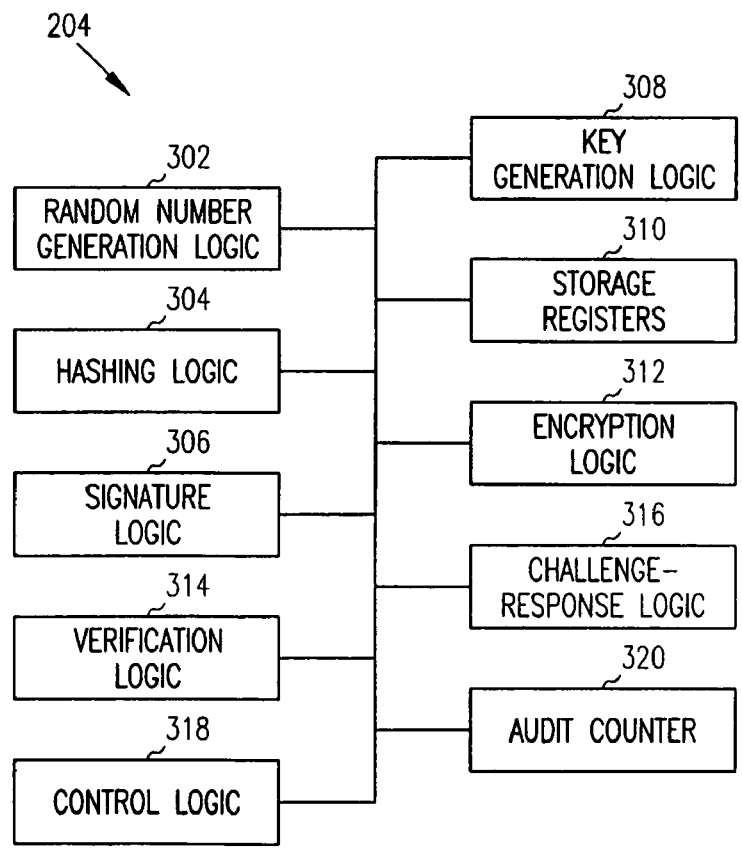
FIG. 3 illustrates a more detailed block diagram of a cryptographic processing module in a computing device for multi-authentication and audit operations, according to one embodiment of the invention.
Figure 4:
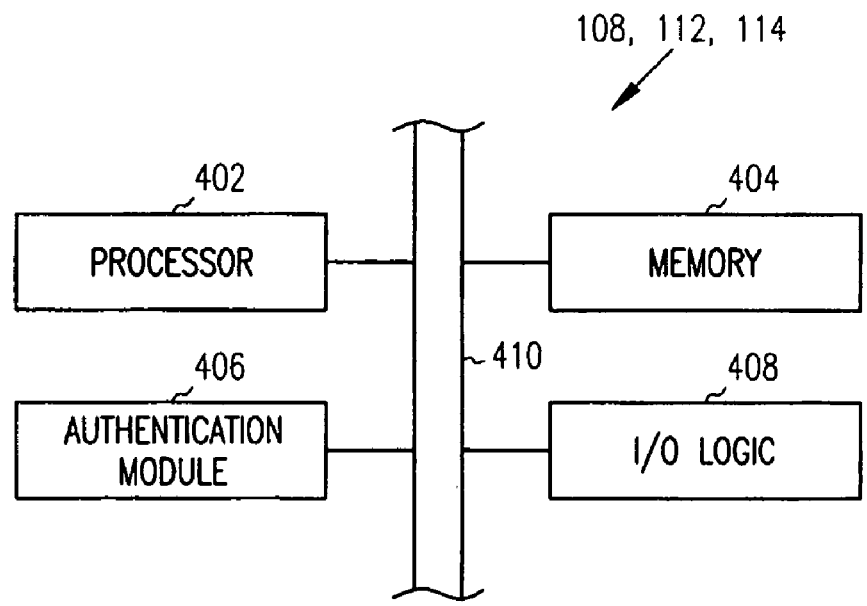
FIG. 4 illustrates logic within equipment of an operator/service provider for multi-authentication, according to one embodiment of the invention.
Figure 5:
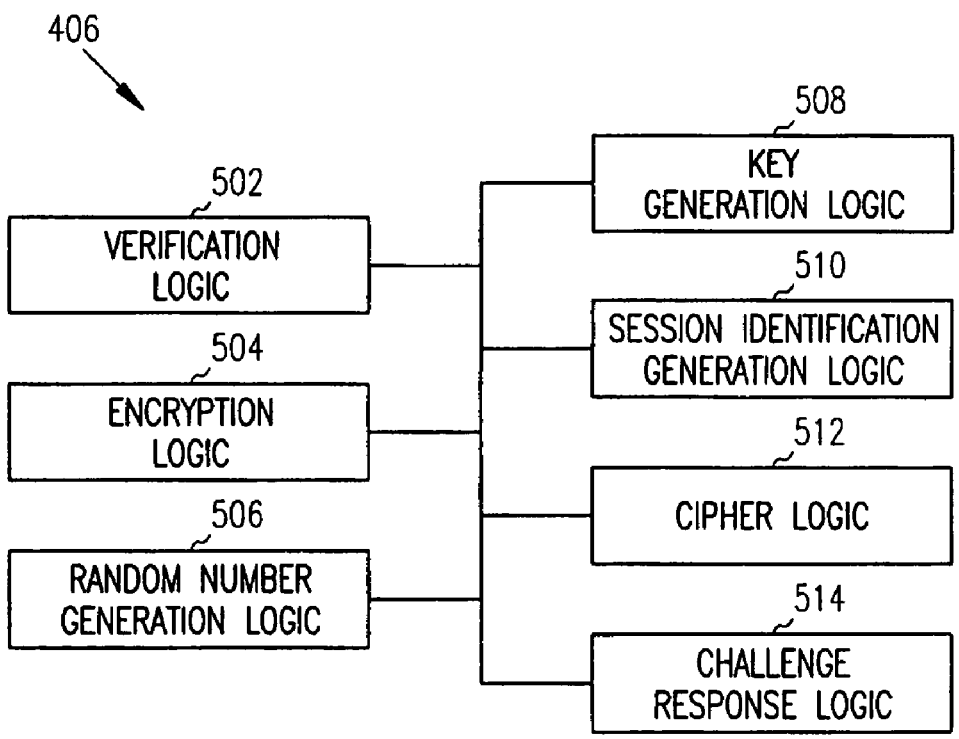
FIG. 5 illustrates a more detailed block diagram of an authentication module in equipment of an operator/service provider for multi-authentication, according to one embodiment of the invention.

This section provides an overview of the hardware and the operating environment in which embodiments of the invention can be practiced. FIGS. 2 and 3 illustrate the computing device 102 and components therein. FIGS. 4 and 5 illustrate the equipment of the operator/service provider and components therein.

FIG. 2 illustrates a more detailed block diagram of a computing device for multi-authentication, according to one embodiment of the invention. FIG. 2 illustrates one embodiment of the computing device 102 that includes a processor 202, a cryptographic processing module 204, a communications processor 206, a memory 208, an input/output (I/O) logic 210 and a memory 214, which are coupled together through a bus 212.

While the memory 208 may be of any suitable type of memory, in an embodiment, the memory 208 is different types of Random Access Memory (RAM) (e.g., Synchronous RAM (SRAM), Synchronous Dynamic RAM (SDRAM), Dynamic RAM (DRAM), Double Data Rate (DDR)-SDRAM, etc.) of varying size (e.g., one megabyte, two megabytes, etc.). While the memory 214 may also be of any suitable type of memory, in an embodiment, the memory 214 is Electrically Erasable Programmable Read-Only Memory (EEPROM), such as a flash memory, of varying size (e.g., 32 megabytes, 64 megabytes, etc.) or a general-purpose storage disk (e.g., hard disk). As further described below, the memory 208 and the memory 214 may store different data associated with the multi-authentication and audit operations. For example, the memory 208 and the memory 214 may store encrypted data, encryption keys, etc.

The I/O logic 210 provides an interface to I/O devices or peripheral components for the computing device 102. The I/O logic 210 may comprise any suitable interface controllers to provide for any suitable communication link to different components of the computing device 102. The I/O logic 210 for one embodiment provides suitable arbitration and buffering for one of a number of interfaces. In an embodiment, the I/O logic 210 includes a network interface to provide an interface to one or more remote devices over a number of communication networks (the Internet, an Intranet network, an Ethernet-based network, etc.) based on a number of different communication network protocols. For example, in an embodiment, the I/O logic 210 is to receive and transmit data involving the multi-authentication, auditing and/or the communications subsequent to such authentication (electronic commerce transactions).

The communications processor 206 may be different types of processors to execute instructions/applications for processing of the communications for the computing device 102 received into the I/O logic 210. The communications processor 206 may process communications based on any of a number of different protocols on a number of different I/O ports of the I/O logic 210.

The processor 202 may be different types of general purpose application processors. As further described below, instructions/applications executing within the processor 202 may perform and/or cause to perform multi-authentication, auditing and subsequent communication operations. The authentication and audit operations may include different types of hashing operations, encryption/decryption operations, generation of random numbers, etc. The communication operations may include the exchange of data (e.g., identification of transaction, monetary amount of transaction, method of payment, the identification of the entities/parties involved in the transaction, the entities/parties involved in the transaction, the transaction initiation and termination times, etc.) with a web site on a server selling e-Tickets, etc. In an embodiment, the computing device 102 stores electronic money (using, for example, an electronic (e)-wallet), wherein such electronic money may be used as the method of payment in the transactions.

In one embodiment, instructions/applications executing within the processor 202 use the cryptographic processing module 204 to perform the multi-authentication and audit operations. In an embodiment, the cryptographic processing module 204 is hardware logic that may be embedded within the main circuit board of the computing device 102. The cryptographic processing module 204 may be circuitry formed as part of the fabrication of the main circuit board of the computing device 102. In an embodiment, the cryptographic processing module 204 may be a separate component that is attached (post fabrication) to the main circuit board (through, for example, a socket connection).

A more detailed description of one embodiment of the cryptographic processing module 204 is now described. In particular, FIG. 3 illustrates a more detailed block diagram of a cryptographic processing module in a computing device for multi-authentication and audit operations, according to one embodiment of the invention. FIG. 3 illustrates one embodiment of the cryptographic processing module 204, which includes a random number generation logic 302, a hashing logic 304, a signature logic 306, a key generation logic 308, storage registers 310, an encryption logic 312, a verification logic 314, a challenge-response logic 316, a control logic 318 and an audit counter 320, which are coupled together.

As further described below, the storage registers 310 are protected storage within the computing device 102, which may be used to store data exchanged between the computing device 102 and the operator server 112. Examples of such data may include an attestation key and an identification of a session of communication (between the computing device 102 and the operator server 112). Accordingly, storage in this secure hardware (the cryptographic processing module 204) protects the data from being stolen.

In one embodiment, the components of the cryptographic processing module 204 are used to perform a multi-authentication of the computing device 102 (that includes this cryptographic processing module 204) and an entity that the computing device 102 is to communicate. For example, as described above, the computing device 102 may be a cellular telephone that is to connect to a network through equipment of an operator/service provider for the cellular services (the operator server). Accordingly, the multi-authentication operations authenticate the computing device 102 to the equipment and authenticate the equipment to the computing device 102. In an embodiment, the components of the cryptographic processing module 204 are used to perform audit operations of the multi-authentication operations.

While the random number generation logic 302, the hashing logic 304, the signature logic 306, the key generation logic 308, the encryption logic 312, the verification logic 314, a challenge-response logic 316 and a control logic 318 are described as being hardware, at least a part of such components of the cryptographic processing module 204 may be software, firmware or a combination of hardware, software and/or firmware. The operations of the random number generation logic 302, the hashing logic 304, the signature logic 306, the key generation logic 308, the encryption logic 312, the verification logic 314, a challenge-response logic 316 and a control logic 318 are described in more detail below.

FIG. 4 illustrates logic within equipment of an operator/service provider for multi-authentication, according to one embodiment of the invention. In particular, FIG. 4 illustrates an embodiment of logic within the operator server 112/access points 108A-108N that includes a processor 402, an authentication module 406, a memory 404 and an input/output (I/O) logic 408 that are coupled together through a bus 410.

While the memory 404 may be of any suitable type of memory, in an embodiment, the memory 404 is different types of Random Access Memory (RAM) (e.g., Synchronous RAM (SRAM), Synchronous Dynamic RAM (SDRAM), Dynamic RAM (DRAM), Double Data Rate (DDR)-SDRAM, etc.) of varying size (e.g., one megabyte, two megabytes, etc.). As further described below, the memory 404 may store different data associated with the multi-authentication operations between the computing device 102 and the operator server 112/access points 108A-108N. For example, the memory 404 may store encrypted data, encryption keys, etc.

The I/O logic 408 provides an interface to I/O devices or peripheral components for the operator server 112/access points 108A-108N. The I/O logic 408 may comprise any suitable interface controllers to provide for any suitable communication link to different components of the operator server 112/access points 108A-108N. The I/O logic 408 for one embodiment provides suitable arbitration and buffering for one of a number of interfaces. In an embodiment, the I/O logic 408 includes a network interface to provide an interface to one or more remote devices over a number of communication networks (the Internet, an Intranet network, an Ethernet-based network, etc.) based on a number of different communication network protocols. For example, in an embodiment, the I/O logic 408 is to receive and transmit data involving the multi-authentication and/or the communications subsequent to such authentication (electronic commerce transactions).

The processor 402 may be different types of general purpose application processors. As further described below, instructions/applications executing within the processor 402 may perform and/or cause to perform multi-authentication and subsequent communication operations involving the computing device 102. The authentication operations may include different types of hashing operations, encryption/decryption operations, generation of random numbers, etc.

In one embodiment, instructions/applications executing within the processor 402 cause the authentication module 406 to perform the multi-authentication operations. In an embodiment, the authentication module 406 is hardware logic. In one embodiment, the authentication module 406 is software that execute within the processor 402. In an embodiment, the authentication module 406 may be a combination of software, firmware and/or hardware.

A more detailed block diagram of the authentication module 406 is now described. In particular, FIG. 5 illustrates a more detailed block diagram of an authentication module in equipment of an operator/service provider for multi-authentication, according to one embodiment of the invention. FIG. 3 illustrates one embodiment of the authentication module 406, which includes a verification logic 502, an encryption logic 504, a random number generation logic 506, a key generation logic 508, a session identification generation logic 510, a cipher logic 512 and a challenge-response logic 514, which are coupled together. In one embodiment, such components of the authentication module 406 are used to perform a multi-authentication of the computing device 102 and the equipment for the operator/service provider (that includes the authentication module 406).

In an embodiment, the verification logic 502, the encryption logic 504, the random number generation logic 506, the key generation logic 508, the session identification generation logic 510, the cipher logic 512 and the challenge-response logic 514 may be hardware, software, firmware or a combination thereof. The operations of the verification logic 502, the encryption logic 504, the random number generation logic 506, the key generation logic 508, the session identification generation logic 510, the cipher logic 512 and the challenge-response logic 514 are described in more detail below.

Multi-Authentication Operations

Figure 6:
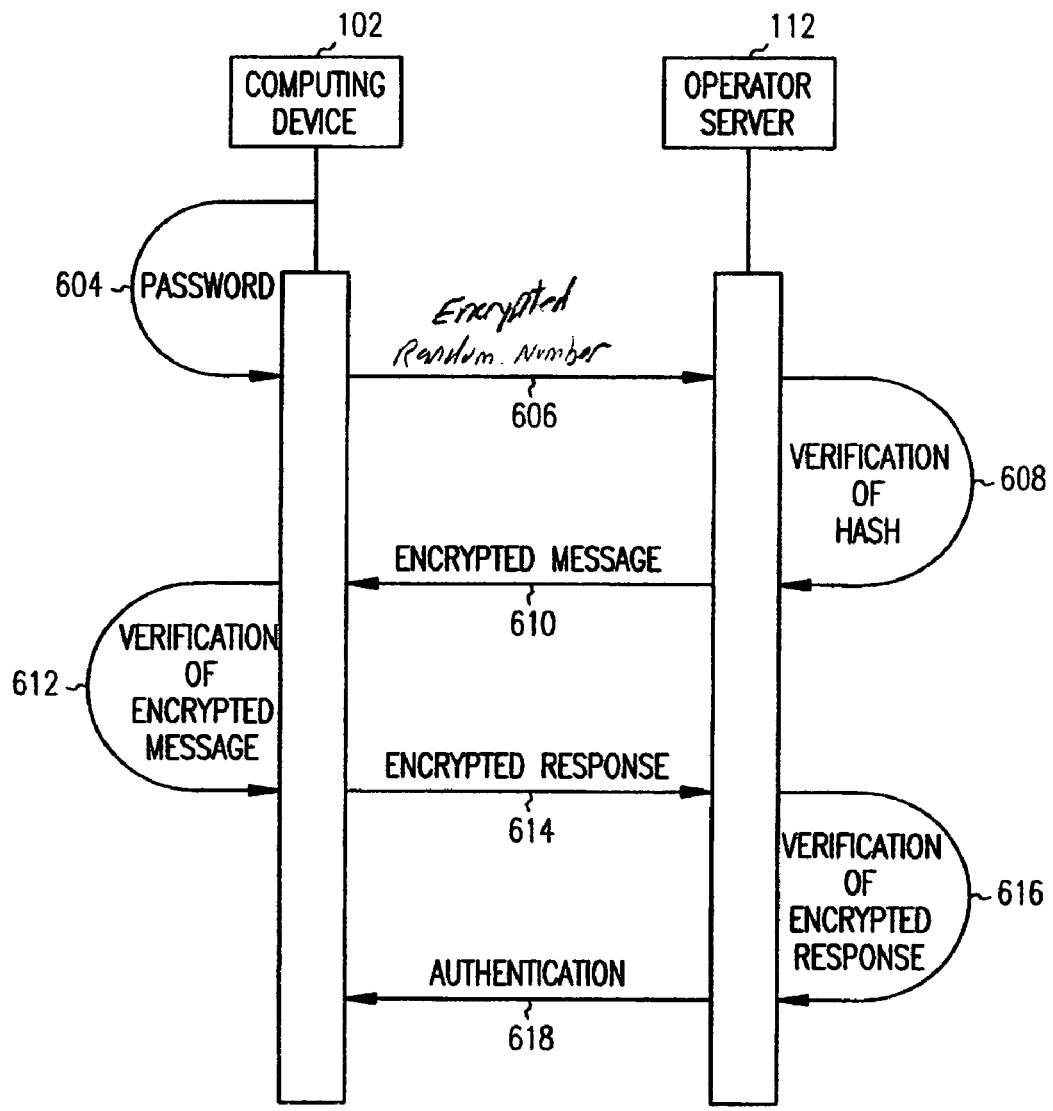
FIG. 6 illustrates messaging between a computing device and equipment of an operator/service provider for multi-authentication, according to one embodiment of the invention.
Figure 7A:
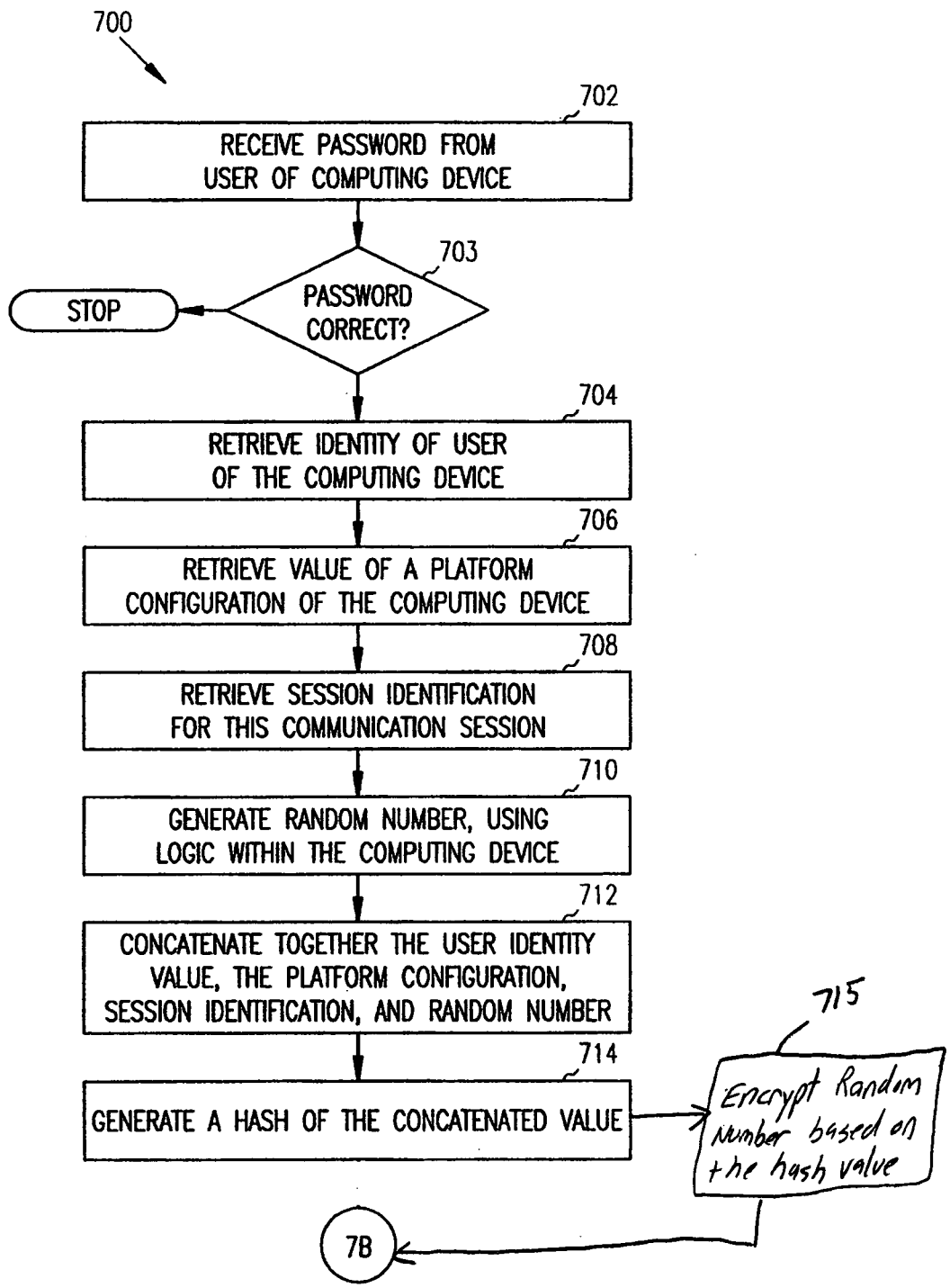
FIGS. 7A-7B illustrate a flow diagram for multi-authentication operations in a computing device, according to one embodiment of the invention.
Figure 7B:
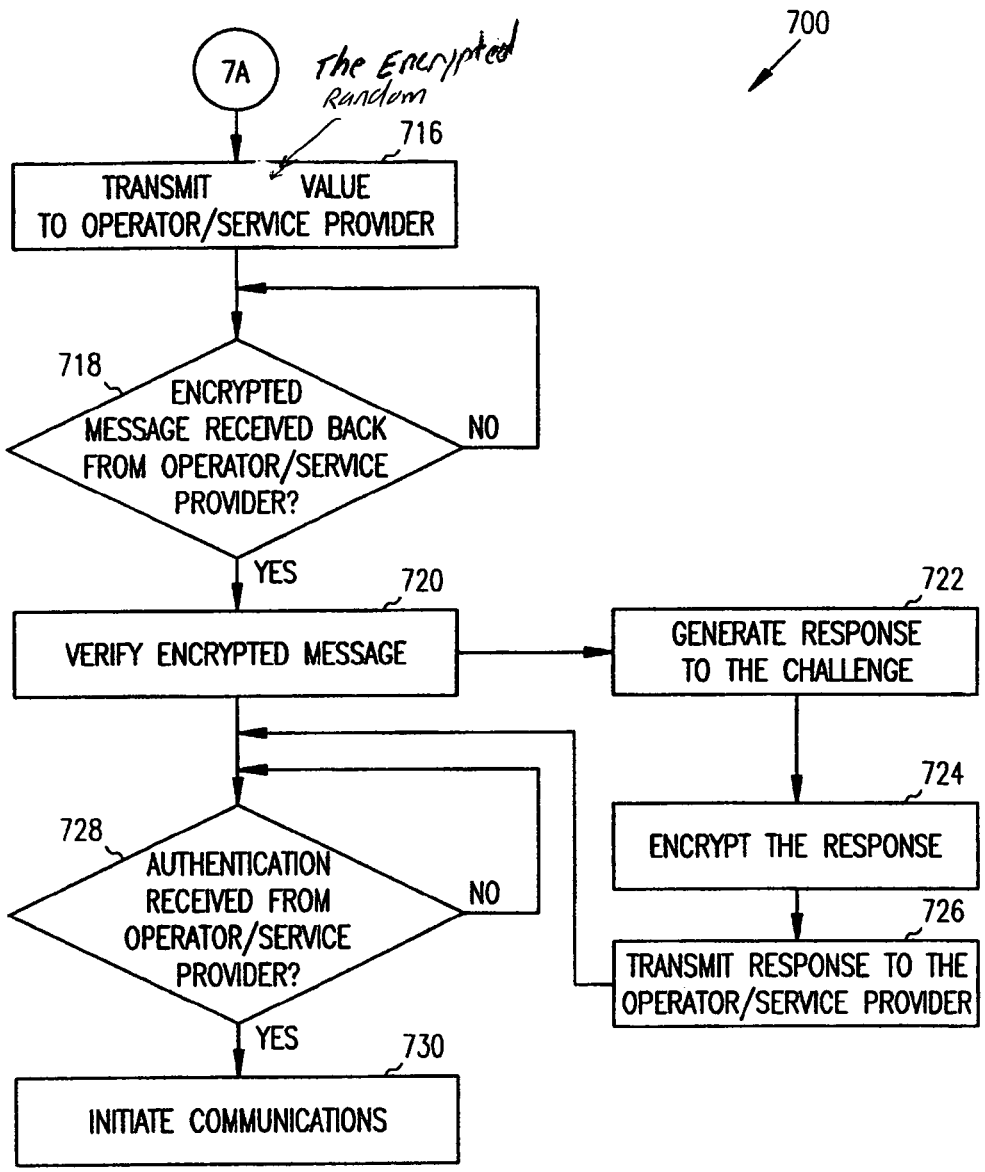
Figure 8A:
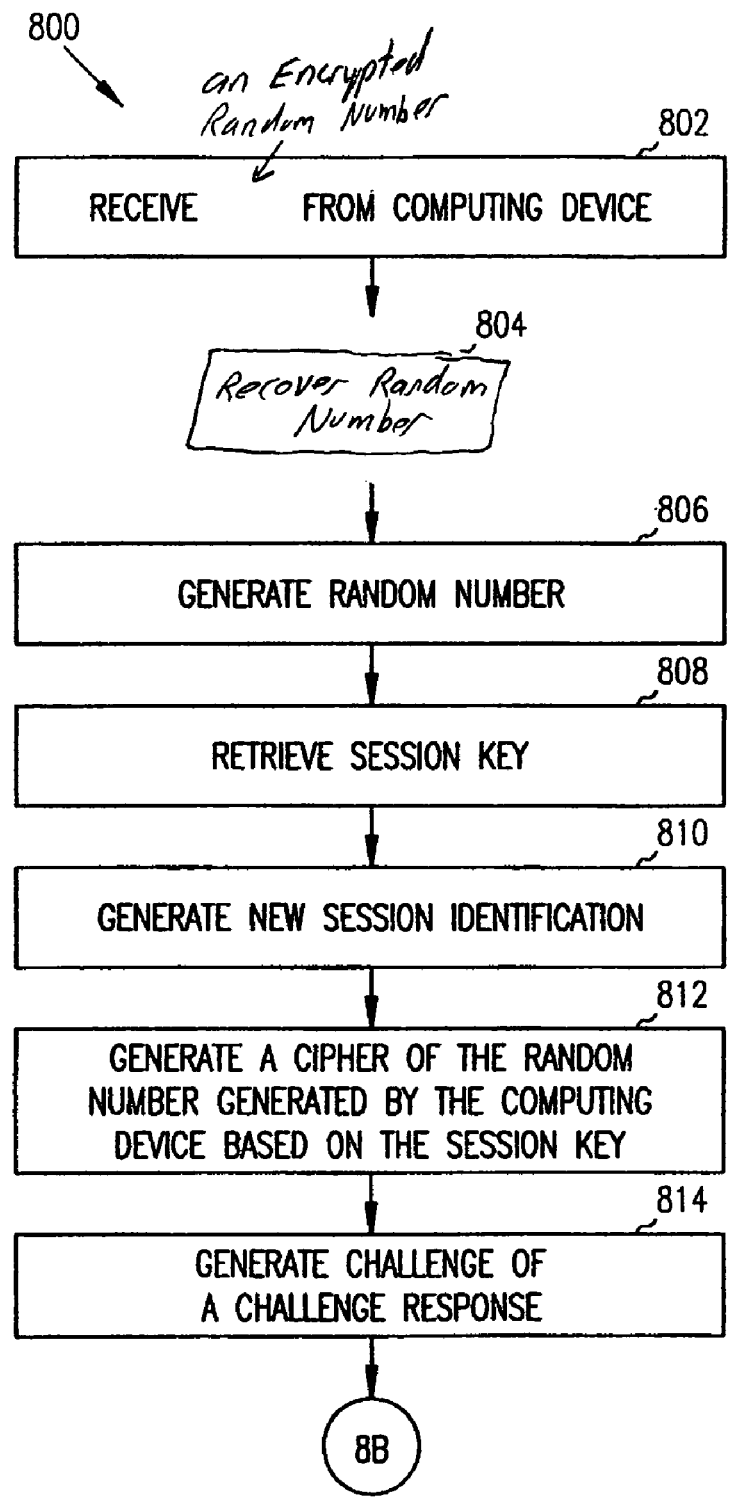
FIGS. 8A-8B illustrate a flow diagram for multi-authentication operations by an operator, according to one embodiment of the invention.
Figure 8B:
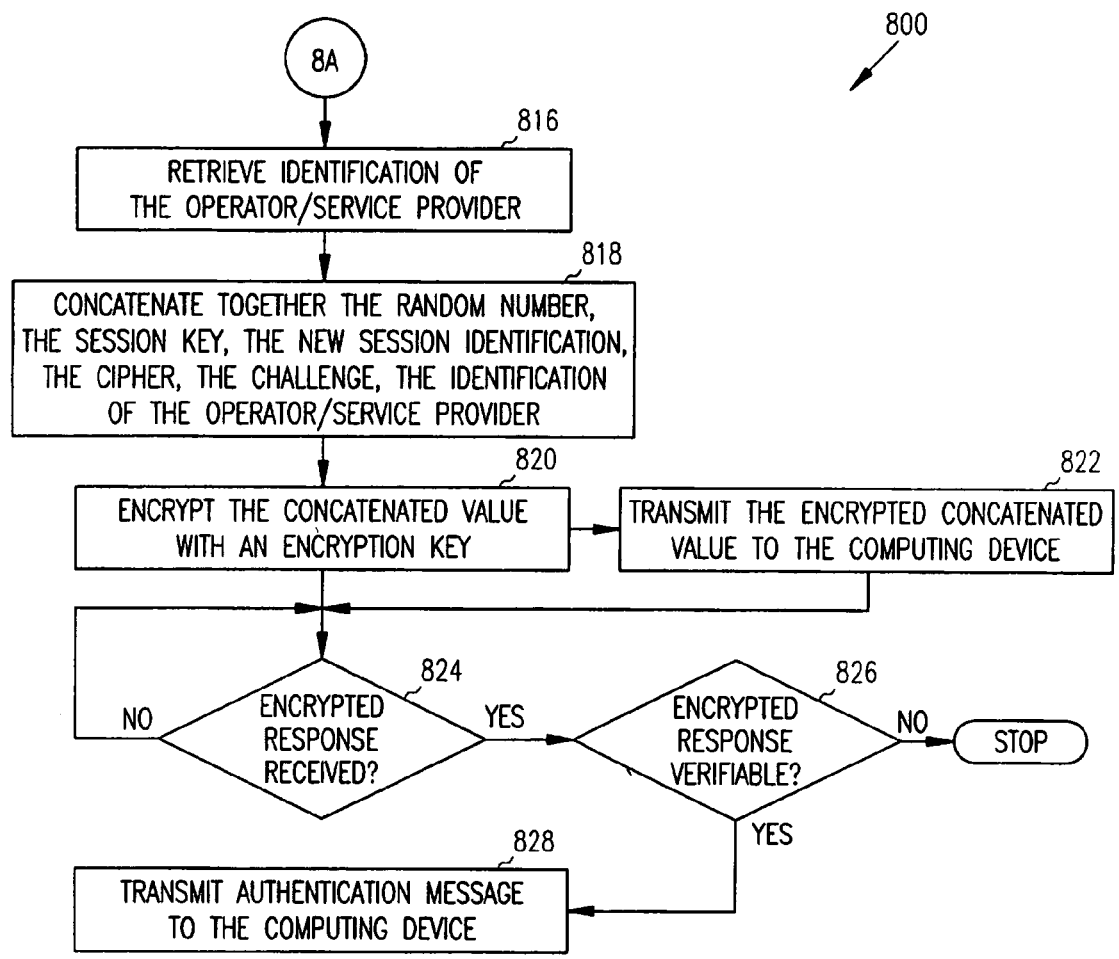

This section provides an implementation for multi-authentication operations for embodiments of the invention. In this section, FIG. 6 illustrates the messaging between the computing device and equipment of the operator or provider of services for the computing device. FIGS. 7A-7B illustrate operations within the computing device, while FIGS. 8A-8B illustrate operations within such equipment.

FIG. 6 illustrates messaging between a computing device and equipment of an operator/service provider for multi-authentication, according to one embodiment of the invention. In addition to the messages for multi-authentication illustrated in FIG. 6, in one embodiment, the operator server 112 may transmit an attestation key to the computing device 102 that identifies the computing device 102 as a trustworthy platform. In one embodiment, the attestation key is symmetric.

In an embodiment, the network operator supplies this attestation key to the computing device 102 in a secure environment or via a secure link (e.g., an SSL encrypted communications link) as part of the initial provisioning of the computing device 102 by the network operator. In one embodiment, the operator server 112 may encrypt the attestation key with a cryptographic key (e.g., an asymmetric key (such as an (AIK)) to the computing device 102.

One additional message may be sent from the operator server 112 to the computing device 102 prior to the multi-authentication messages described below. This message is transmitted from the equipment (the operator server 112/access points 108A-108N) to the computing device 102 and includes a session identification, which is used to reduce the likelihood of replay attacks (as further described below).

Additionally, FIG. 6 is illustrated such that the equipment for the operator/service provider is the operator server 112. However, such messaging is also applicable to the access points 108A-108N.

The computing device 102 receives a password 604 from a user of the computing device 102. The password may be a PIN number, a combination of a username/password, etc. Such password precludes an unauthorized use of the computing device 102. Additionally, the password may unlock access to the attestation key and the last session identification received from the operator server 112.

In an embodiment, the subsequent messaging/operations shown in FIG. 6 commence after the computing device 102 or the operator server 112 attempts communications with the other. For example, if the computing device 102 attempts to connect to the network 106 to perform an m-Commerce transaction with an application executing on the server 104A (through the operator server 112), such messaging/operations commence.

The computing device transmits a random number that is protected by a one-time-pad key (an encrypted random number 606) to the operator server 112. In an embodiment, the random number is protected by the one-time-pad key through encryption based on any of a number of different logical operations involving the random number and the one-time-pad key. For example, the encryption may comprise an exclusive-OR operation of the value of the random number with the value of the one-time-pad key.

In an embodiment, the one-time-pad key is generated from a hash that includes values known to the operator server 112. For example, such values may include an identification of the computing device 102, an identification of the operator server 112, the attestation key, the platform configuration measurement (of the computing device 102), the last known session identification, etc.

The operator server 112 performs an operation 608, which is verification of the hash operation. As described in more detail below, as part of the verification, the operator server 112 performs the hash operation to duplicate the one-time-pad key. The operator server 112 may recover the random number by performing the inverse logical operation (performed by the computing device 102 as part of the protection of the random number). In an embodiment, the operator server 112 may use the one-time-pad key to encrypt more than the random number, thereby allowing the operator server 112 to ensure that the computing device 102 properly constructed the one-time-pad key and that the computing device 102 is authenticate. For example, in one embodiment, the random number is concatenated with the identification of the computing device 102. Accordingly, the operator server 112 uses the one-time-pad key to encrypt this concatenation.

The operator server 112 transmits an encrypted message 610 back to the computing device 102. In one embodiment, the encrypted message 610 includes a challenge to the computing device 102. The computing device 102 performs an operation 612, which verifies the encrypted message. The computing device 102 transmits an encrypted response 614 back to the operator server 112. In an embodiment, the encrypted response 614 includes a response to the challenge that was included in the encrypted message 610. The operator server 112 performs an operation 616, which verifies the encrypted response. In an embodiment, the operator server 112 verifies the correctness of the response to the challenge. The operator server 112 then transmits an authentication message 618 back to the computing device 102, which indicates successful completion of the multi-authentication operations, according to an embodiment of the invention. Accordingly, the operator server 112 has authenticated the computing device 102, while the computing device 102 has authenticated the operator server 112. In other words, there is multi-authentication between the computing device 102 and the equipment of the operator/service provider.

A more detailed description of these different operations and messaging is now set forth in conjunction FIGS. 7A-7B and 8A-8B. In particular, FIGS. 7A-7B illustrate a flow diagram for multi-authentication operations in a computing device, according to one embodiment of the invention.

The description of the flow diagram 700 is with reference to authentication operations in relation to the operator server 112. Such description is applicable to authentication operations in relation to the access points 108A-108N.

In block 702, a password is received from the user of the computing device. With reference to the embodiment of FIG. 2, the I/O logic 210 may receive input from the user. With regard to the embodiment of FIG. 6, this operation is illustrated by the password 604 received by the computing device 102. For example, the user may enter a PIN number through a keypad that enables the use of the computing device 102. Control continues at block 703.

In block 703, a determination is made of whether the password is correct. With reference, to the embodiment of FIG. 2, an application executing in the processor 202 may receive and verify that this password is correct. In one embodiment, the cryptographic processing module 204 receives the password and unlocks access to the storage registers 310 (that includes the attestation key and the last session identification) upon verification of this password. Upon determining that the password is not correct, the operations of the flow diagram 700 are completed without the multi-authentication.

In block 704, upon determining that the password is correct, the identity of the user of the computing device 102 is retrieved. With reference to the embodiments of FIGS. 2 and 3, the hashing logic 304 retrieves this identity, which may be stored in one of the storage registers 310, the memory 208 or the memory 214. In one embodiment, the operator server 112 is aware of the value of this identity. In an embodiment wherein the computing device 102 is a telephone, this identity may be the telephone number of the computing device 102. In one embodiment, this identity may be an identification associated with the user that is stored in the Home Location Register (HLR) database in the network for the operator/service provider. For example, the identification may be the name of the user, maiden name of the mother of the user, etc. Control continues at block 706.

In block 706, a value of a platform configuration of the computing device is retrieved. With reference to the embodiment of FIG. 3, the hashing logic 304 retrieves this platform configuration value from one of the storage registers 310. In one embodiment, this platform configuration is a configuration/version of the software and/or firmware being executed within the computing device 102. For example, this platform configuration may be a hash based on the current operating system, the Basic Input/Output System (BIOS), etc. In an embodiment, this platform configuration could be the current configuration/version of at least one part of the hardware in the computing device 102. For example, this platform configuration may be the configuration/version of the cryptographic processing module 204. Accordingly, this measure is tied to the platform of the computing device 102. Replay attacks on the operator server 212 from a rogue computing device are, therefore, precluded because such a device may not have the same hardware/firmware/software configuration as the computing device 102. In an embodiment, this platform configuration is encrypted. In one embodiment, this platform configuration is encrypted based on an encryption key generated by the key generation logic 308. In one embodiment, the key generation logic 308 generates this encryption key based on the attestation key. Control continues at block 708.

In block 708, a session identification for this communication session is retrieved. With reference to the embodiment of FIG. 3, the hashing logic 304 retrieves this session identification from one of the storage locations in the computing device 102 (the memory 208, the memory 214 or one of the storage registers 310). In an embodiment, the operator server 112 generates and transmits this session identification to the computing device 102. In one embodiment, this session identification is encrypted by the encryption logic 312 (based on an encryption key generated by the key generation logic 308). As further described below, this session identification is a temporary value that is updated by the operator server 112. Control continues at block 710.

In block 710, a random number is generated using logic within the computing device 102. With reference to the embodiment of FIG. 3, the random number generation logic 302 generates this random number. Additionally, the encryption logic 312 retrieves this random number. Control continues at block 712.

In block 712, the identity of the user, a measure of the platform configuration and a session identification are concatenated together to form the one-time-pad key. With reference to the embodiment of FIG. 3, the hashing logic 304 concatenates together the identity of the user, a measure of the platform configuration and/or a session identification. While described as a concatenation of these three values, embodiments of the invention are not so limited. For example, the concatenation may include a lesser or greater number of values. In one embodiment, the concatenation may be any combination of these three values. In an embodiment, additional values may be included. Control continues at block 714.

In block 714, a hash value of the concatenated value is generated. With reference to the embodiment of FIG. 3, the hashing logic 304 generates this hash value. While the hashing logic 304 may generate this hash value based on any suitable hashing operation, in one embodiment, the hashing operation is based on different versions of Secure Hash Algorithm (SHA) or Message Digest (MD) operations (e.g., SHA-1, MD-5, etc.). In one embodiment, the hashing logic 304 generates this hash value based on a Hashed Message Authentication Code (HMAC) operation. In an embodiment, the hashing logic 304 generates this hash value using the attestation key. In one embodiment, the hashing logic 304 generates this hash value using a cryptographic key that is based on the identification of the session and the attestation key. Control continues at block 715.

In block 715, the random number is encrypted based on the hash value. With reference to the embodiment of FIG. 3, the encryption logic 312 retrieves the hash value and performs the encryption of the value of the random number based on the hash value. As described above, in an embodiment, the encryption logic 312 performs this encryption based on any of a number of different logical operations. In an embodiment, the encryption logic 312 encrypts the random number by performing an exclusive OR operation of the value of the random number and the hash value. In one embodiment, the encryption logic 312 performs this encryption of the random number using the hash value based on any of a number of different encryption operations (such as DES, AES, etc.). In an embodiment, at least one other value is concatenated to the random number. Such values may include the identification of the device 102, the identification of the session, etc. The encryption logic 312 then encrypts the concatenation of this at least one other value and the random number. Control continues at block 716 (illustrated in FIG. 7B).

In block 716, the encrypted random value is transmitted to the operator/service provider. With reference to the embodiment of FIG. 1, the computing device 102 transmits the encrypted random value to the operator server 112. With regard to the embodiment of FIG. 6, this operation is illustrated by the encrypted random number 606 transmitted by the computing device 102 to the operator server 112. Control continues at block 718.

In block 718, a determination is made of whether an encrypted message is received back from the operator/service provider. With reference to the embodiment of FIG. 4, the verification logic 314 makes this determination. Upon determining that this encrypted message is not received, control continues at block 718, where this determination is again made. Accordingly, the verification logic 314 continues making this determination. In an embodiment, the verification logic 314 may time out after a predetermined time if this message is not received, thereby aborting the multi-authentication operations.

In block 720, upon determining that this encrypted message is received, the encrypted message is verified. With reference to the embodiment of FIG. 3, as part of the verification, the encryption logic 312 decrypts this encrypted message. With regard to the embodiment of FIG. 6, this operation is illustrated by the verification of encrypted message 612 by the computing device 102. In one embodiment, the encryption is an asymmetric operation. Accordingly, the encryption logic 312 decrypts this encrypted message with the public key associated with the private key used to perform the encryption. In another embodiment, the encryption is a symmetric operation. The encryption logic 312, therefore, decrypts this encrypted message with the key used to perform the encryption. For a symmetric encryption, the key may be the attestation key that is shared between the device 102 and the operator server 112.

In one embodiment, the verification logic 314 verifies the values stored in the concatenated value that has been decrypted. As further described below in conjunction FIGS. 8A-8B, the encrypted message includes the attestation key and a challenge of a challenge-response. In one embodiment, the verification logic 314 verifies that the attestation key is within the concatenated value. In an embodiment, this attestation key may be subsequently used to replace or update a new attestation key, as described in more detail below.

Moreover, the encryption logic 312 decrypts the challenge based on the attestation key. This decryption extracts 1) the random number generated within the computing device 102 (and transmitted in the encrypted value at block 716), 2) a random number generated within the operator server 112 (which is described in conjunction with the flow diagram 800 of FIGS. 8A-8B) and 3) a newly generated session identification (which is also described in conjunction with the flow diagram 800). See the discussion of block 814 in FIG. 8A regarding the generation of this challenge. In an embodiment, the verification logic 314 verifies that the random number generated within the computing device 102 has been returned within this challenge. Control continues at block 722.

In block 722, a response is generated to the challenge (stored in the encrypted message). With reference to the embodiment of FIG. 3, the challenge-response logic 316 generates the response. In one embodiment, the challenge-response logic 316 concatenates the random number generated by the computing device 102 and the random number generated within the operator server 112. The challenge-response logic 316 encrypts this concatenated value with the attestation key to generate the response. While a number of different encryption operations may be used, in one embodiment, the challenge-response logic 316 encrypts the concatenated value with the attestation key based on the Advanced Encryption Standard (AES) or other block/stream cipher. Control continues at block 724.

In block 724, the response to the challenge is encrypted. With reference to the embodiment of FIG. 3, the encryption logic 312 encrypts this response. In an embodiment, the encryption is asymmetric. Accordingly, the encryption logic 312 encrypts the response with a private key and the operator server 112 decrypts with the associated public key. However, embodiments of the invention are not so limited. For example, in one embodiment, the encryption is symmetric, wherein a same encryption key is used to encrypt and decrypt the concatenated value. In an embodiment, the key generation logic 308 generates this encryption key. The key generation logic 308 may generate different types of encryption keys. The key generation logic 308 may generate the encryption key based on the Rivest, Shamir, and Adelman (RSA) algorithm. In one embodiment, the encryption key is a hardware-based encryption key that is generated and/or stored within the cryptographic processing module 204. In an embodiment, the encryption key is generated based on the attestation key. In one embodiment, the encryption logic 312 may encrypt the response to the challenge based on any of a number of different logical operations (such as an exclusive OR operation). Control continues at block 726.

In block 726, the encrypted response is transmitted to the operator server. With reference to the embodiment of FIG. 3, the encryption logic 312 transmits this encrypted response to the operator server 112. With regard to the embodiment of FIG. 6, this operation is illustrated by the encrypted response 614 transmitted by the computing device 102 to the operator server 112. Control continues at block 728.

In block 728, a determination is made of whether an authentication is received. In particular, as illustrated in FIG. 6, the operator server transmits an authentication message back to the computing device 102, after receipt and verification of the encrypted response. With reference to the embodiment of FIG. 3, the verification logic 314 makes this determination. Upon determining that this authentication is not received, control continues at block 728, where this determination is again made. Accordingly, the verification logic 314 continues making this determination. In an embodiment, the verification logic 314 may time out after a predetermined time if this response is not received, thereby aborting the multi-authentication operations.

In block 730, upon determining that this authentication is received, communications may be initiated. In particular, the multi-authentication operations have completed such that both the computing device 102 and the operating server 112 have authenticated each other. Therefore, with reference to the embodiment of FIG. 2, the communication processor 206 may initiate communications for transmitting data (through the I/O logic 210) to various entities on the network 106.

The authentication operations within the operator server 112/access points 108A-108N are now described. In particular, FIGS. 8A-8B illustrate a flow diagram for multi-authentication operations by an operator, according to one embodiment of the invention. The description of the flow diagram 800 is described with reference to operations in the operator server 112. Such description is applicable to operations in the access points 108A-108N.

In block 802, an encrypted random number is received from the computing device. With regard to the embodiment of FIG. 6, this operation is illustrated by the encrypted random value 606 being received by the operator server 112 from the computing device 102. With reference to the embodiment of FIG. 4, the I/O logic 408 receives the encrypted random number from one of the computing devices 102 and forwards the encrypted random number to the authentication module 406. Control continues at block 804.

In block 804, the random number is recovered. With reference to the embodiment of FIG. 5, the verification logic 502 recovers the random number. With regard to the embodiment of FIG. 6, this operation is illustrated by the verification of the hash 608 by the operator server 112. In an embodiment, the verification logic 502 generates the one-time-pad key (which may be a hash of values concatenated together) in the computing device 102 (illustrated in blocks 712 and 714). The verification logic 502 may recover the random value by decrypting the encrypted random value based on hash value. For example, if the encryption of the random value is based on a logical operation (such as an exclusive-OR operation), the verification logic 502 may perform the inverse of the logical operation to recover the random number. As described in one embodiment, the encryption may include additional data that is concatenated to the random number. If the additional data includes the identification of the computing device 102, the verification logic 502 may also recover this identification and verify its value. If the identification of the computing device 102 cannot be verified, the verification logic 502 may abort the multi-authentication operations. Control continues at block 806.

In block 806, a random number is generated. With reference to the embodiment of FIG. 5, the random number generation logic 506 generates this random number. The encryption logic 504 retrieves this random number. Control continues at block 808.

In block 808, the attestation key for this session is retrieved. With reference to the embodiment of FIGS. 4 and 5, the encryption logic 504 retrieves the attestation key from the memory 408. As described above, the attestation key generation logic 508 generates an attestation key for a given session with a computing device 102. In addition to being stored in the memory 408, the attestation key is transmitted to the computing device 102 prior to the multi-authentication operations. In an embodiment, this attestation key is stored in secure storage within the computing device 102. For example, this attestation key is stored in one of the storage registers 310 within the cryptographic processing module 204. Control continues at block 810.

In block 810, a new session identification is generated. With reference to the embodiment of FIG. 5, the session identification generation logic 510 generates a new session identification. Control continues at block 812.

In block 812, a cipher of the recovered random number (from the computing device 102) is generated based on the attestation key. With reference to the embodiment of FIG. 5, the cipher logic 512 generates this cipher. While a number of different cipher operations may be used, in one embodiment, the cipher logic 512 generates this cipher based on the A3/A5 (Katsumi) ciphering algorithms, the Advanced Encryption Standard, etc. As further described below, this cipher is concatenated to the new session identification as part of the encrypted message transmitted back to the computing device 102. Accordingly, this concatenation of the cipher to the new session identification allows for a concealment of the new session identification. Control continues at block 814.

In block 814, a challenge of a challenge-response is generated. With reference to FIG. 5, the challenge-response logic 514 generates the challenge. In one embodiment, the challenge-response logic 514 concatenates the recovered random number (from the computing device 102), the random number generated within the operator server 112 and the new session identification. The challenge-response logic 514 encrypts this concatenated value with the attestation key, thereby generating the challenge. While a number of different encryption operations may be used, in one embodiment, the challenge-response logic 514 encrypts the concatenated value with the attestation key based on the Advanced Encryption Standard (AES) or other block/stream cipher. Control continues at block 816 (illustrated in FIG. 8B).

In block 816, an identification of the operator/service provider is retrieved. With reference to the embodiments of FIGS. 4 and 5, the encryption logic 504 may retrieve this identification from the memory 404. While this identification may be based on different values, in one embodiment, this identification is based on a carrier defined identity such as an International Mobile Equipment Identity (IMEI), an International Mobile Station Identity (IMSI), a Temporary Subscriber Identity Module (TSMI) or a Home Location Register (HLR) ID. Control continues at block 818.

In block 818, the random number (generated within the operator server 112), the attestation key, the new session identification, the cipher, the challenge and the identification of the operator/service provider are concatenated together. With reference to the embodiment of FIG. 5, the encryption logic 504 concatenates together the random number (generated within the operator server 112), the attestation key, the new session identification, the cipher, the challenge and the identification of the operator/service provider. Embodiments of the invention are not limited to this combination of values to form the concatenated value. For example, the concatenated value may have any combination of the random number (generated within the operator server), the attestation key, the new session identification, the cipher, the challenge and the identification of the operator/service provider. Moreover, the concatenated value may have additional attributes included therein. Control continues at block 820.

In block 820, the concatenated value is encrypted with an encryption key. With reference to the embodiment of FIG. 5, the encryption logic 504 encrypts the concatenated value with an encryption key. In an embodiment, the encryption is asymmetric. Accordingly, the encryption logic 504 encrypts the response with a private key and the computing device 102 subsequently decrypts with the associated public key. However, embodiments of the invention are not so limited. For example, in one embodiment, the encryption is symmetric, wherein a same encryption key is used to encrypt and decrypt the concatenated value. In one embodiment, this encryption key is the attestation key. In an embodiment, the key generation logic 508 generates this encryption key. The key generation logic 508 may generate different types of encryption keys. The key generation logic 508 may generate the encryption key based on the Rivest, Shamir, and Adelman (RSA) algorithm. In one embodiment, the key generation logic 508 may generate the encryption key based the attestation key. Control continues at block 822.

In block 822, the encrypted concatenated value is transmitted to the computing device. With reference to the embodiment of FIG. 5, the encryption logic 504 transmits this encrypted concatenated value to the computing device 102 (that transmitted the hash value received in block 802). With regard to the embodiment of FIG. 6, this operation is illustrated by the encrypted message 610 being transmitted by the operator server 112 to the computing device 102. Control continues at block 824.

In block 824, a determination is made of whether an encrypted response is received (in response to the encrypted concatenated value). With reference to the embodiment of FIG. 4, the verification logic 402 makes this determination. Upon determining that this encrypted response is not received, control continues at block 824, where this determination is again made. Accordingly, the verification logic 402 continues making this determination. In an embodiment, the verification logic 402 may time out after a predetermined time if this response is not received and abort the multi-authentication operations.

In block 826, upon determining that this encrypted response is received, a determination is made of whether the encrypted response may be verified. With reference to the embodiment of FIG. 5, as part of the verification, the encryption logic 504 decrypts this encrypted message. With regard to the embodiment of FIG. 6, this operation is illustrated by the verification of the encrypted response 616 by the operator server 112. In one embodiment, the encryption is an asymmetric operation. Accordingly, the encryption logic 504 decrypts this encrypted message with the public key associated with the private key used to perform the encryption. In another embodiment, the encryption is a symmetric operation. The encryption logic 504, therefore, decrypts this encrypted message with the key used to perform the encryption. This decryption outputs the response to the challenge.

The encryption logic 504 decrypts the response to the challenge based on the attestation key. This decryption extracts 1) the random number generated within the computing device 102 (and transmitted in the encrypted random value at block 716) and 2) the random number generated within the operator server 112 (and transmitted in the encrypted message to the computing device at block 822). In an embodiment, the verification logic 502 verifies that the random number generated within the computing device 102 is the same as the random number transmitted within the encrypted random value at block 716. In one embodiment, the verification logic 502 verifies that the random number generated by the operator server 112 is the same as the random number transmitted within the encrypted message at block 822. Upon determining that the encrypted response is not verifiable, the operations of the flow diagram 800 are completed without the multi-authentication.

In block 828, upon determining that the encrypted response is verifiable, an authentication message is transmitted to the computing device 102. With reference to the embodiment of FIG. 4, the I/O logic 404 transmits this authentication message to the computing device 102. With regard to the embodiment of FIG. 6, this operation is illustrated by the authentication message 618 being transmitted by the operator server 112 to the computing device 102.

Accordingly, the multi-authentication operations have completed such that both the computing device 102 and the operating server 112 have authenticated each other. The computing device 102 is authenticated to the operating server 112 based upon the use of the identification of the session and the attestation key. Moreover, use of PCR values provides proof that the computing device 102 is properly configured and is executing malicious code (such as a Trojan, virus, etc.). Further, validation of the computing device 102 can be retrieved from the audit records, which are described in more detail below.

The operating server 112 is authenticated to the computing device 102 based on proper recovery of the random number using the generated (hashed) key based on a knowledge of the identification of the session of communication and the attestation key as well as the proper use of the attestation key within the challenge to the computing device 102.

Audit Operations of the Multi-Authentication

Figure 9:
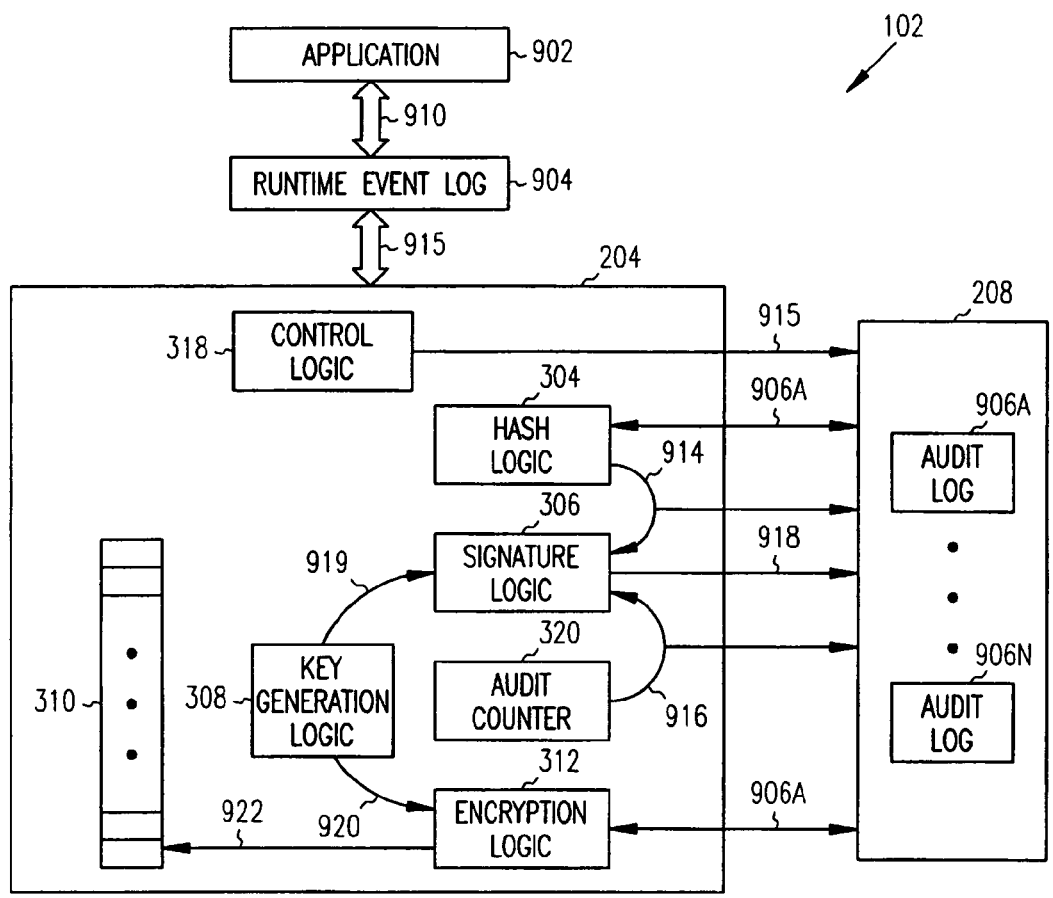
FIG. 9 illustrates the messaging related to the different operations of a computing device for performing secured and selective runtime audit services, according to one embodiment of the invention.
Figure 10A:
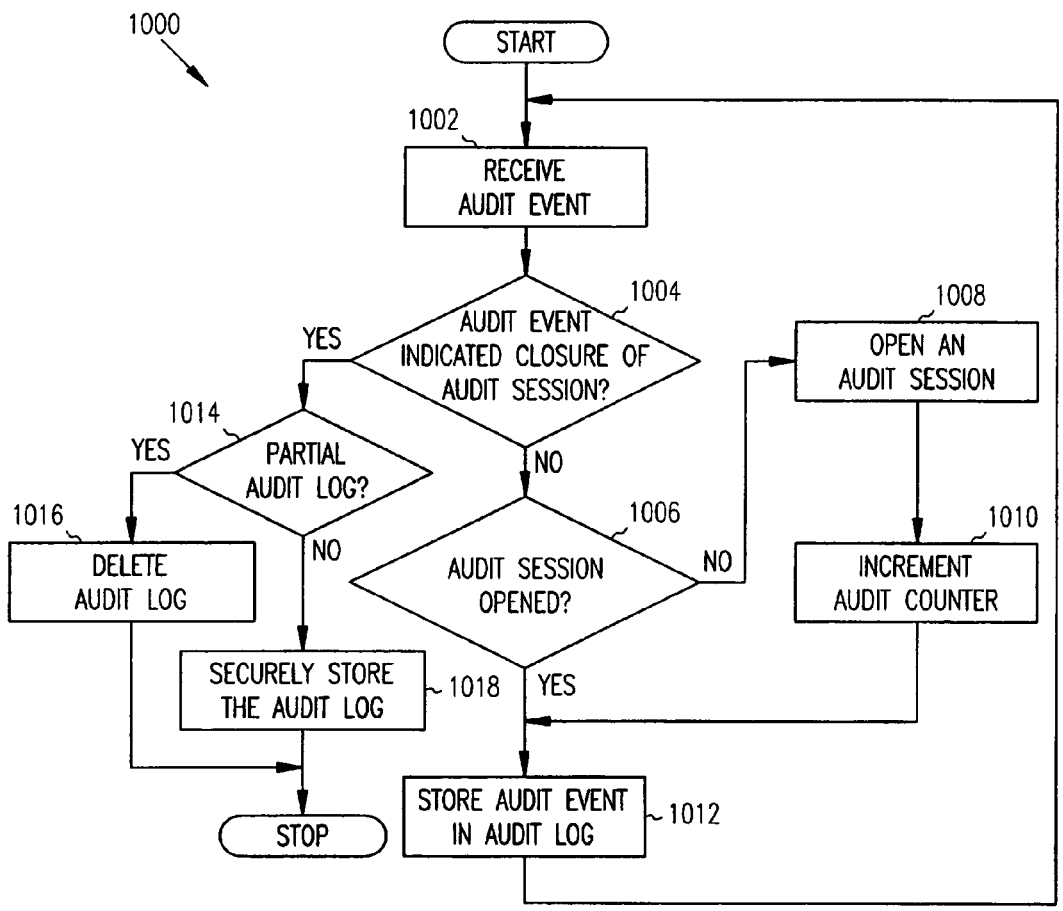
FIGS. 10A-10B illustrates a flow diagram for secured and selective audit services, according to one embodiment of the invention.
Figure 10B:
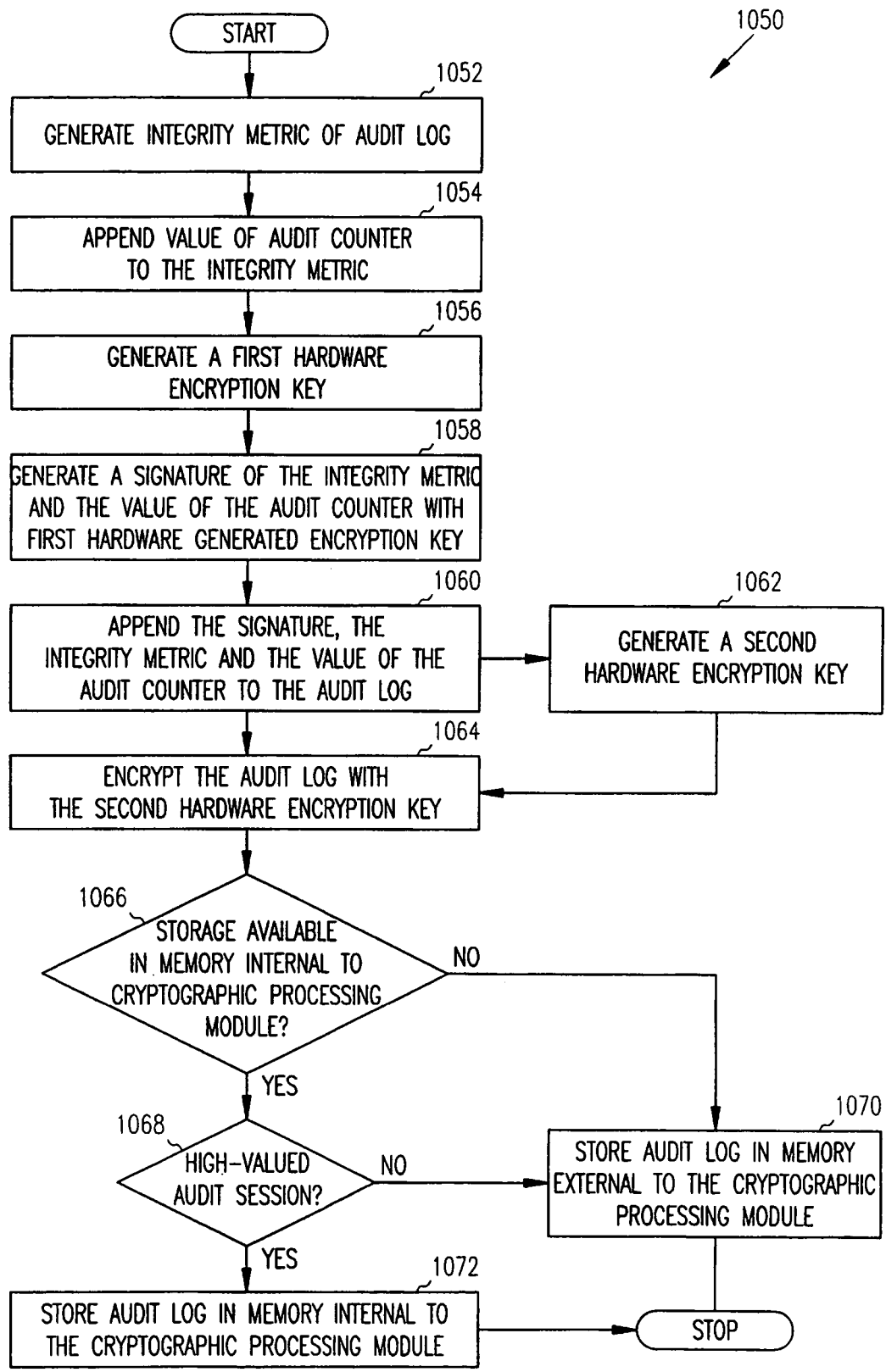

This section provides an implementation for audit operations of the multi-authentication. In particular, in one embodiment, the multi-authentication operations may be audited to maintain a log of such multi-authentication operations. In this section, FIG. 9 illustrates the messaging within the computing device for performing audit operations for multi-authentication. FIGS. 10A-10B illustrate operations for secured and selective audit services.

FIG. 9 illustrates the messaging related to the different operations of a computing device for performing secured and selective runtime audit services, according to one embodiment of the invention. As shown, the computing device 102 includes an application 902, a runtime event log 904, the cryptographic processing module 204 and the memory 208. In an embodiment, the application 902 and the runtime event log 904 are operations executing in the processor 202 (shown in FIG. 2).

The application 902 processes the different transactions between the computing device 102 and a separate entity (e.g., one of the servers 104A-104N). The application 902 transmits events 910 to the runtime event log 904. The events 910 may include execution of a function within the application 902, wherein an event is to be audited when a Boolean value-based parameter of the function is set to a logical high. With regard to the multi-authentication, examples of the events 910 may be the different messages and operations for multi-authentication (as shown in FIG. 6). In one embodiment, the runtime event log 904 is a standard Java method or Java Native Interface (JNI) that is modified to allow for selected auditing of transactions by the computing device 102. In an embodiment, the runtime event log 904 may be an MS.NET assembly, a Web Service or other type of application executing within the computing device 102. The runtime event log 904 selects/determines whether the events are to be audited (which is described in more detail below). The runtime event log 904 transmits the events 915 to the control logic 318.

As shown, the control logic 318 transmits the audit events 915 to the associated audit log 906A-906N. In one embodiment, the audit events 915 may include attributes of the given transaction (e.g., identification of the type of operation, identification of transaction, monetary amount of transaction, method of payment, the identification of the entities/parties involved in the transaction, the entities/parties involved in the transaction, the transaction initiation and termination times, etc.). If the event 910 received by the control logic 318 causes an audit session to be opened, the control logic 318 creates an audit log 906 for the given audit session. Therefore, when subsequent audit events 915 (such as different parts of the multi-authentication operation) are received, the control logic 318 transmits the audit events 915 to the associated audit log 906. As further described below, an audit event 915 that closes the audit session is received. For example, the completion of the multi-authentication may generate an audit event 915 that closes the audit session. In one embodiment, an explicit command from the operator/service provider may transmit an explicit audit event to close the current audit session.

Additionally, as shown, the hashing logic 304 retrieves the audit log 906 from the memory 208 after the associated audit session has been closed. The hashing logic 304 generates an integrity metric 914 based on the audit log 906. The signature logic 306 receives the integrity metric 914 and generates a digital signature 918 of the integrity metric 914. In one embodiment, the signature logic 306 requests an encryption key 919 from the key generation logic 308 and generates the digital signature 918 using the encryption key 919. In one embodiment, the signature logic 306 also receives the current value of the audit counter 320 (audit value 916) and generates a digital signature 918 of the audit value 916 (using the same encryption key 919 or a different encryption key). Alternatively, the signature logic 306 receives the integrity metric 914 and the audit value 916 and generates a single digital signature 918 of the integrity metric 914 and the audit value 916 (using the encryption key 919).

In one embodiment, the integrity metric 914, the digital signature 918 and the audit value 916 are stored with the associated audit log 906. For example, the digital signature 918, the integrity metric 914 and the audit value 916 are appended to the associated audit log 906. In another embodiment, only the digital signature 918 is stored with the audit log 906.

The encryption logic 312 requests an encryption key 920 (that is different from the encryption key 919) from the key generation logic 308 and encrypts the associated audit log 906. In an embodiment, the encryption logic 312 encrypts the audit data (e.g., the attributes of the transaction) (not including the integrity metric 914, the audit value 916 or the signature 918). In an alternative embodiment, the encryption logic 312 encrypts the audit data along with the integrity metric 914, the audit value 916 and the signature 918. While FIG. 9 illustrates the encryption logic 312 storing the encrypted audit log 922 in a part of one of the storage registers 310, in an embodiment, the encrypted audit log 922 may be stored in a memory external to the cryptographic processing module 204 (e.g., the memory 208, the memory 214, etc.), which is described in more detail below.

The operations of secured selective audit services will now be described. FIGS. 10A-10B illustrates a flow diagram for secured and selective audit services, according to one embodiment of the invention.

In block 1002 of the flow diagram 1000 (of FIG. 10A), an audit event is received. With reference to the embodiment in FIG. 9, the runtime event log 904 receives a number of different events 910 (including events to be audited) and determines whether the event is to be audited. In one embodiment, the commands executed by the application 902 have associated command ordinals. A given command ordinal has an associated indicator stored in the storage registers 310 that indicates whether execution of the command by the application 902 generates an audit event. Accordingly, the runtime event log 904 determines whether a transaction is to be audited based on the associated indicator stored in the storage registers 310. In one embodiment, the commands that are selectively audited may be dynamically adjusted. For example, the network operator of the computing device 102 and/or operator/the service provider may download modifications to the list of commands that are to be audited into the computing device 102. Control continues at block 1004.

In block 1004, a determination is made of whether the audit event indicates closure of an audit session. With reference to the embodiment in FIG. 9, the control logic 318 determines whether the audit event indicates closure of an audit session. As described above, a number of different audit events may indicate closure of a current audit session. For example, the completion of a multi-authentication operation may serve as an indication that the current audit session is to be closed. In one embodiment, an explicit command from the network operator/service provider of the computing device 102 may transmit an explicit audit event to close the current audit session. Upon determining that the audit event indicates closure of an audit session, control continues at block 1012, which is described in more detail below.

In block 1006, upon determining that the audit event does not indicate closure of an audit session, a determination is made of whether an audit session is open. With reference to the embodiment in FIG. 9, the control logic 318 determines whether an audit session is open. In an embodiment, only one audit session at a time may be open. Upon determining that an audit session is open, control continues at block 1010, which is described in more detail below.

In block 1008, upon determining that an audit session is not open, an audit session is opened. With reference to the embodiment in FIG. 9, the control logic 318 opens an audit session. The control logic 318 creates the associated audit log 906 within the memory 208 for this audit session. In one embodiment, the control logic 318 may apply a time stamp to the associated audit log 906. For example, the control logic 318 may append a time stamp to the associated audit log 906. In an embodiment, the cryptographic processing module 204 includes a timer that is non-volatile. Accordingly, the control logic 318 applies a timestamp that is the number of ticks of this timer within the cryptographic processing module 204. Such timestamps may protect against replay attacks, where the messages involved in the transactions are intercepted and subsequently replayed. Therefore, if the audit log includes a timestamp, a replay of the messages of the transactions can be differentiated because the times are different. Control continues at block 1010.

In block 1010, the audit counter is incremented. With reference to the embodiment in FIG. 9, the control logic 318 increments the value of the audit counter 320. Accordingly, the value of the audit counter 320 is incremented each time an audit session is opened. Therefore, (assuming that the audit counter 320 does not roll over during the life time operation of the computing device 102), the different audit sessions will have unique values for the audit counter 320. Control continues at block 1012.

In block 1012, the audit event is stored in the audit log. With reference to the embodiment in FIG. 9, the control logic 318 stores the audit events 915 into the current audit log 906. Therefore, the different audit events 915 that occur while the audit session is open are stored in the associated audit log. For example, an audit session may be opened when a multi-authentication operation is initiated between the computing device 102 and a different entity. During the multi-authentication operation, a number of operations that exchange data between the computing device 102 and the different entity are performed by the application 902 executing on the processor 202. Such operations may be audit events. Therefore, the attributes of the multi-authentication operation are stored in the audit log. For example, the random numbers, the challenges/responses of the challenge-responses, the session identifications, the attestation keys, etc. After storage of the audit event into the audit log, control continues at block 1002, wherein the operations of the flow diagram 1000 wait to receive another audit event.

In block 1014, upon determining that an audit event indicates closure of an audit session, a determination is made of whether there is a partial audit log. With reference to the embodiment in FIG. 9, the control logic 318 determines whether there is a partial audit log. In an embodiment, the audit log is considered partial if a transaction is not complete prior to receiving an audit event that indicates that the audit session is to be closed. For example, the computing device 102 may be involved in a multi-authentication operation when an explicit audit event is received from the service provider to close a current audit session. To further illustrate, the computing device 102 may be involved in a multi-authentication operation when power of the computing device 102 is lost (dead batteries, user turns off power, etc.) or network connection is interrupted. This loss of power or interruption of the network connection may cause the audit session to close prior to completion of the multi-authentication operation.

In block 1016, upon determining that there is a partial audit log, the audit log is deleted. With reference to the embodiment in FIG. 9, the control logic 318 deletes the partial audit log. Partial audit logs may be deleted because such logs cannot be used to audit the transactions. The partial audit logs may be corrupted because the control logic 318 may have been in the process of storing an audit event 915 into the audit log 906 when power was lost or the network connection was interrupted, thereby only storing a part of the audit event 915. Because the integrity of partial audit logs cannot used to perform audits, the unused audit logs 906 are deleted, in order to preserve space within the memory that is of limited size internal and/or external to the cryptographic processing module 204. The operations of the flow diagram 1000 are completed.

In block 1018, upon determining that the audit log is not partial, the audit log is securely stored. With reference to the embodiment in FIG. 9, a number of the components of the cryptographic processing module 204 (such as the hashing logic 304, the signature logic 306, the audit counter 320, the key generation logic 308, the encryption logic 312, etc.) securely store the audit logs 906 in the storage registers 310, the memory 208 or the memory 214.

A more detailed description of this secure storage of the audit log is now described with reference to the flow diagram 1050 of FIG. 10B. In block 1052, an integrity metric of the audit log is generated. With reference to the embodiment in FIG. 9, the hashing logic 304 retrieves the audit log 906 from the memory 208 and generates an integrity metric (hash value, audit digest) representative of the data within the audit log 906. Control continues at block 1054.

In block 1054, the value of the audit counter is appended to the integrity metric. With reference to the embodiment in FIG. 9, the signature logic 306 receives the integrity metric 914 and the value of the audit counter 320 (the audit value 916) and appends the value of the audit value 916 to the integrity metric 914. Control continues at block 1056.

In block 1056, a first hardware encryption key is generated. With reference to the embodiment in FIG. 9, the key generation logic 308 generates a first hardware encryption key 919. The key generation logic 308 may generate a number of different encryption keys based upon requests from different components within the cryptographic processing module 204, the application 902 or the runtime event log 904. Accordingly, the key generation logic 308 generates the first hardware encryption key 919 based on a request from the signature logic 306. Control continues at block 1058.

In block 1058, a signature of the integrity metric and the value of the audit counter is generated based on the first hardware encryption key. With reference to the embodiment in FIG. 9, the signature logic 306 generates a digital signature of the integrity metric 914 and the audit value 916. The signature logic 306 signs the integrity metric 914 and the audit value 916 with the first hardware encryption key 919 using any of a number of suitable encryption operations. While described such that a single digital signature of the integrity metric 914 and the audit value 916 is generated, embodiments of the invention are not so limited. In an alternative embodiment, the signature logic 306 generates a digital signature of only the integrity metric 914, thereby leaving the audit value 916 unencrypted. In another embodiment, the signature logic 306 generates a first digital signature of the integrity metric 914 and a second digital signature of the audit value 916. Control continues at block 1060.

In block 1060, the signature, the integrity metric and the value of the audit counter are appended to the audit log. With reference to the embodiment in Figure 9, the signature logic 306 and/or or the hashing logic 304 appends the digital signature 918, the integrity metric 914 and the audit value 916 to the associated audit log 906. In an alternative embodiment, the signature logic 306 only appends the digital signature 918 to the associated audit log 906. Control continues at block 1062.

In block 1062, a second hardware encryption key is generated. With reference to the embodiment in FIG. 9, the key generation logic 308 generates a second hardware encryption key 920. The key generation logic 308 may generate the second hardware encryption key 920 based on a request from the encryption logic 312. Control continues at block 1064.

In block 1064, the audit log is encrypted with the second hardware encryption key. With reference to the embodiment in FIG. 9, the encryption logic 312 encrypts the audit log 906 with the second hardware encryption key 920. As described above, the encryption logic 312 may encrypt the audit data (not including the integrity metric 914, the audit value 916 or the signature 918). In an alternative embodiment, the encryption logic 312 encrypts the audit data along with the integrity metric 914, the audit value 916 and the signature 918. Control continues at block 1066.

In block 1066, a determination is made of whether storage is available in memory that is internal to the cryptographic processing module. With reference to the embodiment in FIG. 9, the control logic 318 determines whether storage is available in the storage registers 310 in the cryptographic processing module 204. Upon determining that storage is not available in memory that is internal to the cryptographic processing module 204, control continues at block 1070, which is described in more detail below.

In block 1068, upon determining that storage is available in internal memory of the cryptographic processing module, a determination is made of whether the audit session is considered a high-valued audit session. With reference to the embodiment in FIG. 9, the control logic 318 determines whether the audit session is considered a high-valued audit session. An audit session may be considered of high-value based on a number of different criteria. For example, the criteria could include the values of attributes of transactions that occur in the audit session.

In an embodiment, the audit session is considered of high-value based on the identification of the computing device 102 and/or the authorized user thereof. In one embodiment, the audit session is considered of high-value if a monetary amount of an electronic commerce transaction is above a given limit. The audit session may be considered of high-value if an electronic commerce transaction involving a given entity (for a service provider, etc.) occurs within this session. Upon determining that the audit session is not of high value, control continues at block 1070, which is now described.

In block 1070, the encrypted audit log is stored in a memory that is external to the cryptographic processing module. With reference to the embodiment in FIG. 9, the encryption logic 312 may store the encrypted audit log 922 in either the memory 208 or the memory 214. The operations of the flow diagram 1050 are complete.

In block 1072, the encrypted audit log is stored in a memory that is internal to the cryptographic processing module. With reference to the embodiment in FIG. 9, the encryption logic 312 may store the encrypted audit log 922 in a part of one of the available storage registers 310. The operations of the flow diagram 1050 are complete.

While the flow diagram 1050 illustrates a number of operations in a given order for the secure storage of the audit log, in another embodiment, the order of such operations may be modified. For example, in an embodiment, the generation of the digital signature of the integrity metric and/or the audit value is independent of the encryption of the audit log. Accordingly, the encryption of the audit log may be performed prior to, during and/or after the generation of the digital signature of the audit log.

Additionally, the flow diagram 1050 may be modified such that the encrypted audit logs are not differentiated based on the value of the audit session. Accordingly, the encrypted audit logs are stored in the storage registers 310 until there is no storage available in the storage registers 310. The encrypted audit logs are subsequently stored in one of the memory external to the cryptographic processing module 204 (e.g., a flash memory, a hard disk, etc.).

Therefore, as described, embodiments of the invention do not require the storage of digital certificates in the computing devices 102 and the equipment for the operator/service provider. Moreover, the multi-authentication (as described) helps to obviate a number of threats to the compromise regarding communications between the computing device and the equipment of the operator/service provider. For example, replay attacks are obviated by the incorporation of the random numbers into the digital signatures transmitted from the computing devices 102 to the operator servers. In one embodiment, the operator servers 112 do not accept hash values with the same value from the same computing device 102 more than once.

Further, embodiments of the invention preclude the use of stolen hardware from within the computing device 102 to successfully perform the multi-authentication. In particular, the unique identity of the user of the computing device 102 (and not the identity of the computing device 102) precludes the use of stolen hardware that does not include this identity. Additionally, as described above, embodiments of the invention include transient encryption keys and session identifications, thereby precluding the use of encryption keys that have been compromised.

As described, in an embodiment, a session identification and a random number are involved in the multi-authentication operations. Such values are dynamic, thereby precluding attacks on the equipment of the operator/service provider by devices that do not include such values. In particular, the random number therein causes the hash value to be unique. Accordingly, such verification precludes replay attacks from rogue computing devices that attempt to authenticate itself to the operator/service provider.

In the description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that embodiments of the invention may be practiced without such specific details. In other instances, control structures, gate level circuits and full software instruction sequences have not been shown in detail in order not to obscure the embodiments of the invention. Those of ordinary skill in the art, with the included descriptions will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Embodiments of the invention include features, methods or processes that may be embodied within machine-executable instructions provided by a machine-readable medium. A machine-readable medium includes any mechanism which provides (i.e., stores and/or transmits) information in a form accessible by a machine (e.g., a computer, a network device, a personal digital assistant, manufacturing tool, any device with a set of one or more processors, etc.). In an exemplary embodiment, a machine-readable medium includes volatile and/or non-volatile media (e.g., read only memory (ROM), random access memory (RAM), magnetic disk storage media, optical storage media, flash memory devices, etc.), Such instructions are utilized to cause a general or special purpose processor, programmed with the instructions, to perform methods or processes of the embodiments of the invention. Alternatively, the features or operations of embodiments of the invention are performed by specific hardware components which contain hard-wired logic for performing the operations, or by any combination of programmed data processing components and specific hardware components. Embodiments of the invention include software, data processing hardware, data processing system-implemented methods, and various processing operations, further described herein.

A number of figures show block diagrams of systems and apparatus for multi-authentication for a computing device connecting to a network, in accordance with embodiments of the invention. A number of figures show flow diagrams illustrating operations for multi-authentication for a computing device connecting to a network. The operations of the flow diagrams will be described with references to the systems/apparatus shown in the block diagrams. However, it should be understood that the operations of the flow diagrams could be performed by embodiments of systems and apparatus other than those discussed with reference to the block diagrams, and embodiments discussed with reference to the systems/apparatus could perform operations different than those discussed with reference to the flow diagrams.

In view of the wide variety of permutations to the embodiments described herein, this detailed description is intended to be illustrative only, and should not be taken as limiting the scope of the invention. To illustrate, while described with reference to the concatenation of a set number of values (for the messages during the two-way authentication), embodiments of the invention are not so limited. For example, the encrypted message transmitted from the operator back to the computing device may have any combination of the random number (generated within the operator server), the attestation key, the new session identification, the cipher, the challenge and the identification of the operator/service provider. Moreover, in an embodiment, the encrypted message may include additional values.

What is claimed as the invention, therefore, is all such modifications as may come within the scope and spirit of the following claims and equivalents thereto. Therefore, the specification and drawings are to be regarded in an illustrative rather than a restrictive sense.

What is claimed is:

1. A method comprising:
   performing an authentication of a computing device and equipment of an operator of services for the computing device for a session of communication between the computing device and the equipment, the performing comprising:
      generating, in the computing device, a random number;
      generating a one-time-pad key based on a hash operation of a value selected from the group consisting of an identification of the computing device, an identification of the equipment, a platform configuration measurement of the computing device stored in a protected storage within the computing device and an identification of the session of communication stored in the protected storage within the computing device;
      encrypting the random number based on the one-time-pad key;

transmitting the encrypted random number to the equipment;
receiving, from the equipment, an encrypted value in response to the encrypted random number, wherein the encrypted value includes a challenge of a challenge-response;
verifying the encrypted value;
encrypting a response to the challenge of the challenge-response;
transmitting the response to the equipment; and
receiving, from the equipment, an authentication verification; and
auditing the authentication, wherein auditing comprises:
storing at least one attribute of the authentication into an audit log within a memory of the computing device;
encrypting the audit log based on an encryption key that is generated and stored within the computing device;
generating an integrity metric of the audit log; and
generating a signature of the integrity metric with a signature key that is generated and stored within the computing device.

2. The method of claim 1, wherein the platform configuration measurement of the computing device comprises a version of hardware in the computing device.

3. The method of claim 1, wherein the platform configuration measurement of the computing device comprises a version of software executing in the computing device.

4. The method of claim 1, wherein the challenge of the challenge-response comprises an encryption of a data string that includes a concatenation of the random number generated in the computing device, a random number generated by the equipment and the identification of the session.

5. The method of claim 4, wherein the response of the challenge-response comprises an encryption of a data string that includes a concatenation of the random number generated in the computing device and the random number generated by the equipment.

6. The method of claim 1, wherein auditing the authentication further comprises generating a signature of a value of an audit counter with the signature key.

7. A method comprising:
authenticating a computing device and a different entity for a session of communication between the computing device and the different entity, the authenticating comprising:
generating a hash of a value selected from the group consisting of a platform configuration value associated with computing device stored in the computing device and the identification of the session stored in a protected storage within the computing device and;
encrypting a random number based on the hash;
transmitting the encrypted random number to the different entity; and
auditing the authenticating, wherein auditing comprises,
storing at least one attribute of the authenticating into an audit log within a memory of the computing device;
encrypting the audit log based on an encryption key that is generated and stored within the computing device;
generating an integrity metric of the audit log; and
generating a signature of the integrity metric with a signature key that is generated and stored within the computing device.

8. The method of claim 7, wherein the authenticating further comprises:
encrypting a response to a challenge of a challenge-response, wherein the challenge is received, in response to the encrypted random number, as part of an encrypted value from the different entity; and
transmitting the encrypted response to the different entity.

9. The method of claim 7, further comprising commencing a transaction between the computing device and the different entity, after receiving an authentication verification message in response to the encrypted response from the different entity.

10. The method of claim 7, wherein auditing the authenticating further comprises generating a signature of a value of an audit counter with the signature key.

11. The method of claim 10, wherein auditing the authenticating further comprises appending the integrity metric, the signature of the integrity metric, the signature of the value of the audit counter and the value of the audit counter to the audit log.

12. The method of claim 7, wherein the platform configuration value associated with the computing device comprises a version of hardware in the computing device.

13. The method of claim 7, wherein the platform configuration value associated with the computing device comprises a version of software executing in the computing device.

14. A machine-readable medium that provides instructions, which when executed by a machine, cause said machine to perform operations comprising:
performing an authentication of a computing device and equipment of an operator of services for the computing device for a session of communication between the computing device and the equipment, the performing comprising:
generating, in the computing device, a random number;
generating a one-time-pad key based on a hash operation of a value selected from the group consisting of an identification of the computing device, an identification of the equipment, a platform configuration measurement of the computing device stored in a protected storage within the computing device and an identification of the session of communication stored in the protected storage within the computing device;
encrypting the random number based on the one-time-pad key;
transmitting the encrypted random number to the equipment;
receiving, from the equipment, an encrypted value in response to the encrypted random number, wherein the encrypted value includes a challenge of a challenge-response;
verifying the encrypted value;
encrypting a response to the challenge of the challenge-response;
transmitting the response to the equipment; and
receiving, from the equipment, an authentication verification; and
auditing the authentication, wherein auditing comprises:
storing at least one attribute of the authentication into an audit log within a memory of the computing device;
encrypting the audit log based on an encryption key that is generated and stored within the computing device;

generating an integrity metric of the audit log; and generating a signature of the integrity metric with a signature key that is generated and stored within the computing device.

15. The machine-readable medium of claim 14, wherein the challenge of the challenge-response comprises an encryption of a data string that includes a concatenation of the random number generated in the computing device, a random number generated by the equipment and the identification of the session.

16. The machine-readable medium of claim 15, wherein the response of the challenge-response comprises an encryption of a data string that includes a concatenation of the random number generated in the computing device and the random number generated by the equipment.

17. A machine-readable medium that provides instructions, which when executed by a machine, cause said machine to perform operations comprising:

authenticating a computing device and a different entity for a session of communication between the computing device and the different entity, the authenticating comprising:

generating a hash of a value selected from the group consisting of a platform configuration value associated with computing device stored in the computing device and the identification of the session stored in a protected storage within the computing device and;

encrypting a random number based on the hash;

transmitting the encrypted random number to the different entity; and auditing the authenticating, wherein auditing comprises, storing at least one attribute of the authenticating into an audit log within a memory of the computing device;

encrypting the audit log based on an encryption key that is generated and stored within the computing device;

generating an integrity metric of the audit log; and generating a signature of the integrity metric with a signature key that is generated and stored within the computing device.

18. The machine-readable medium of claim 17, wherein the authenticating further comprises:

encrypting a response to a challenge of a challenge-response, wherein the challenge is received, in response to the encrypted random number, as part of an encrypted value from the different entity; and transmitting the encrypted response to the different entity.

19. The machine-readable medium of claim 17, further comprising commencing a transaction between the computing device and the different entity, after receiving an authentication verification message in response to the encrypted response from the different entity.

20. The machine-readable medium of claim 14, wherein the platform configuration measurement of the computing device comprises a version of hardware in the computing device.

21. The machine-readable medium of claim 14, wherein the platform configuration measurement of the computing device comprises a version of software executing in the computing device.

22. The machine-readable medium of claim 14, wherein auditing the authentication further comprises generating a signature of a value of an audit counter with the signature key.

* * * * *